Oct. 7, 1958

E. M. WILLIAMS 2,855,563

SATURABLE REACTOR SYSTEM

Original Filed April 24, 1950

INVENTOR.
Everard M. Williams
BY
Harry M. Saragovitz
ATTORNEY

Oct. 7, 1958  E. M. WILLIAMS  2,855,563
SATURABLE REACTOR SYSTEM
Original Filed April 24, 1950  2 Sheets-Sheet 2

INVENTOR.
Everard M. Williams
BY
Harry M. Saragovitz
ATTORNEY

# United States Patent Office 2,855,563
Patented Oct. 7, 1958

2,855,563
SATURABLE REACTOR SYSTEM

Everard M. Williams, Edgewood, Pa.

Continuation of application Serial No. 157,840, April 24, 1950. This application May 19, 1955, Serial No. 509,705

4 Claims. (Cl. 323—89)

(Granted under Title 35, U. S. Code (1952), sec. 266)

The invention described herein may be manufactured and used by or for the Government for governmental purposes, without the payment of any royalty thereon.

This application is a continuation of my application S. N. 157,840, filed April 24, 1950, now abandoned.

The present invention relates generally to improvement in saturable reactors and more particularly to saturable reactors having increased sensitivity. An object of the invention is to provide a saturable reactor in which an unbalance in potential is applied to the control windings to divert a portion of the saturating flux through the core of the controlled windings.

It is a further object of this invention to provide a saturable reactor which can operate at any conditions of D. C. flux density. It is a further object of this invention to provide a saturable reactor that can operate at any desired point on the flux density current curve of the core material utilized.

It is a further object of this invention to provide saturable reactors that eliminate the problem of residual D. C. flux.

Other objects of this invention will become apparent to those skilled in the art upon a consideration of the following disclosure and the accompanying claims when the specification is read in connection with the following drawings in which:

The conventional saturable reactor core usually is in the form of a figure eight with the D. C. winding in the center arm and the A. C. windings in each of the loops; the A. C. windings being equivalent and wound in series so that the flux pattern resulting from the A. C. forms a circle thru the two A. C. windings excluding the center D. C. winding. The D. C. winding, when not energized, has no effect on the A. C. windings. When energized the direct current forms a flux pattern which is divided between the two A. C. loops. This tends to alter the magnetic reluctance and thus the inductive reactance or impedance of the A. C. path. In many cases the A. C. and D. C. coils are positioned perpendicular to each other to reduce the coupling effect. Such arrangement is shown in Patent 720,884 to Burgess et al. This type of reactor is similar to the aforementioned conventional reactor in operation in that the D. C. winding produces a saturating flux in the core common to both the A. C. and D. C. windings.

The subject invention differs from the conventional reactor in that a saturating flux passes through the A. C. coil only upon unbalance of the D. C. windings. In this invention a saturable reactor having a pair of A. C. coils wound on a high permeability core and a pair of D. C. coils wound on a low permeability core are positioned on the core structure in such a manner that a slight unbalance of flux density in the D. C. cores produces a relatively large saturating flux thru the A. C. core.

Figure 1:
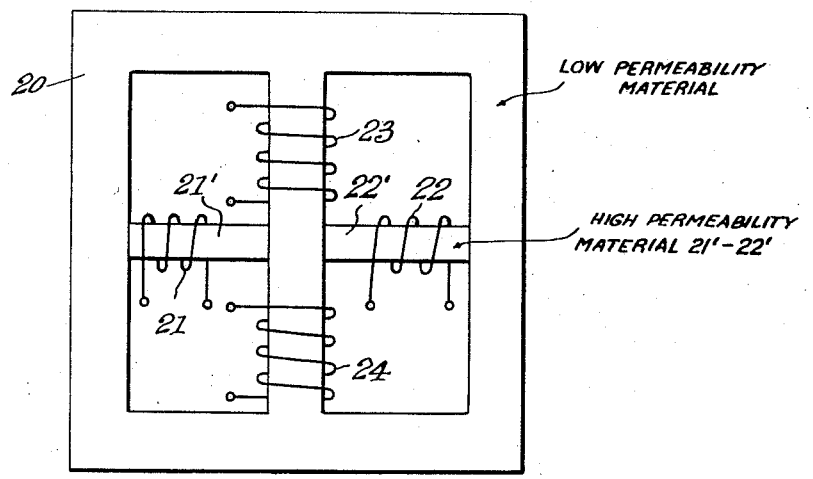
Figure 1 is a diagrammatic view showing the reactor core and the coils in preferred physical relation to each other.

Referring to Figure 1, coils 23 and 24, wound on a center portion of rectangular core structure 20, are each connected to the separate direct current potentials whose unbalance is utilized to vary the A. C. signal. The coils are wound in such a manner that with the applied D. C. potentials, the flux lines are in similar directions. Windings 21 and 22 are wound on cores 21' and 22' of high permeability material and of relatively smaller core sectional area than that of core 20. Coils 21 and 22 are included in the alternating current circuit of the apparatus being controlled. The coils 23 and 24 are normally connected in series so that the current in each is equal and the resulting flux is additive.

The coils 23 and 24, normally connected to separate sources of D. C., can be connected to the outputs of a push-pull amplifier, for example, or one coil can be connected to a constant D. C. potential and the other to a source of variable D. C. potential. When the flux produced by the D. C. coils 23 and 24 is equal no flux appears in the core 21'—22'. Any unbalance of current in coils 23—24 causes an inequality in the flux produced by these coils in the center core and difference in D. C. flux passes thru arms 21—22 thereby bringing these core members nearer their saturation points. This principle is explained in Figures 2 and 3 which illustrate the flux path for various relationships of potentials applied to D. C. control windings 23—24.

Figure 2:
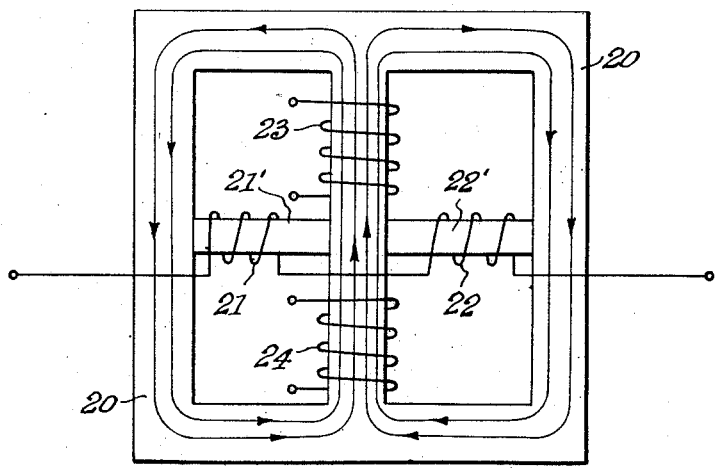
Figure 2 is a similar view illustrating the magnetic flux path with the control windings in a balanced relationship.
Figure 3:
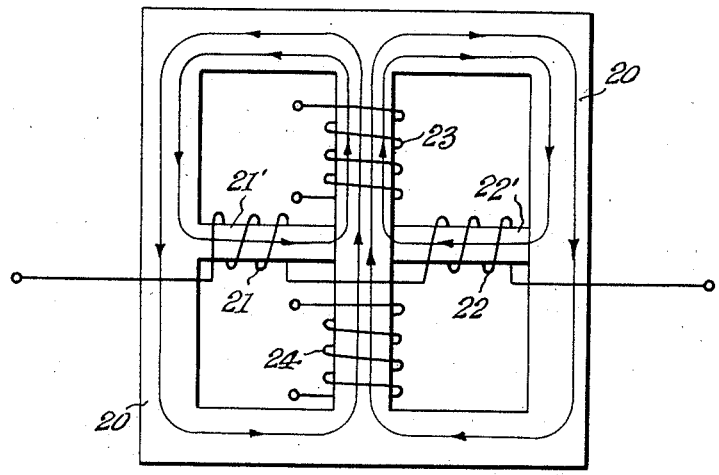
Figure 3 is similar to Figure 2 with the control windings in an unbalanced condition.

In Figure 2 the voltage applied to windings 23 and 24 is equal. As shown, the flux passes through the center core and divides between the two outer cores 20, all of low permeability material. Since cores 21' and 22' are of high permeable material a minimum flux, if any, passes therethrough with substantially all of the flux circulating in the low permeable core 20. When the voltage applied to coils 23 and 24 differs, the resulting flux path is shown in Figure 3. This unbalance in potential, applied to the coils 23 and 24, produces an unbalance in flux density in the upper and lower portion of the central core. This unbalance in flux density results in a portion of the flux circulating in the high permeability cores 21' and 22'. This phenomena is understood by considering the magnetomotive forces analogous to the electromotive forces in an electrical circuit. Considering the core structures as arms in a bridge and the control coils as sources of potential, it will be seen that, when the sources are equal, no difference of potential exists at adjacent points of the outer arms therefore no current and hence no flux would appear in the arm joining the outer arms. This would correspond to the A. C. core. An unbalance of sources, however, results in a difference in potential at adjacent points and therefore a current, or equivalently, a flux would appear in the joining arm. Thus it is seen that in a balanced condition no flux would appear in cores 21' and 22' while with a small unbalance a large change in flux would result. The coils 23 and 24 do not have to be equal for effective operation of this device. If the device is to be operated at equal flux density in arms 23 and 24 and no D. C. flux in arms 21 and 22, and the coils 23—24 have unequal windings, the flux densities in arms 21 and 22 can be equalized by an appropriate difference in current in the coils 23 and 24 or by making the reluctance of the paths thru the sections 21—22 different from the paths thru the sections 23—24.

Figure 4:
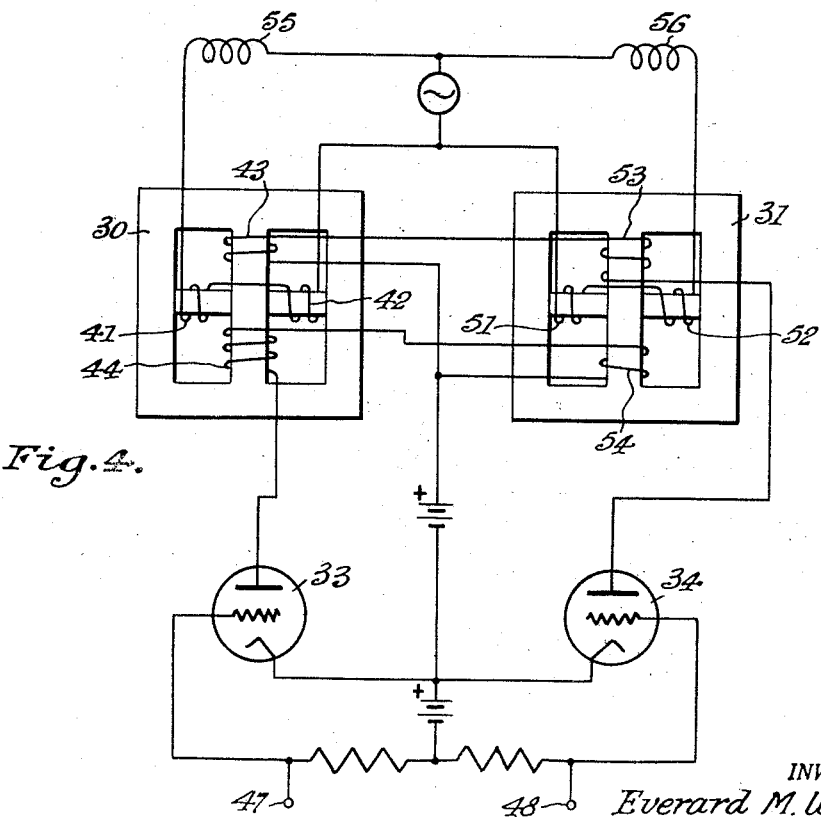
Figure 4 is a diagram of the specific embodiment of the invention wherein two saturable reactors of this invention are shown in an appropriate electronic circuit.

A particular use of this device is in the altitude control circuit of an automatic pilot. Figure 4 shows a circuit in which two saturable reactors 30—31 of this invention have unbalanced windings included in the push-pull circuit. Windings 44 and 54 of saturable reactors 30 and 31, respectively, have more turns than windings 53 and 43. When the push-pull tubes 33 and 34 are balanced, the saturable reactors 30—31 are unbalanced. The A. C. arms of the reactors are relatively saturated with no current applied to the input terminals 47—48. When the current flows from terminal 47 to terminal 48, tube 33 draws more current than tube 34 and reactor 30 is more nearly saturated than reactor 31. Under these conditions, reactor 31 might be completely unsaturated. An unbalance in one direction increases the current in one of the series anode circuits and decreases the current in the other which results in an increase of the D. C. flux in the A. C. core of one reactor and a decrease in the D. C. flux in the other reactor. Thus, the reactance of the A. C. coils of one reactor is increased while the reactance or other A. C. coil is decreased. If the A. C. coils 41—42 of reactor 30 and the A. C. coils 51—52 of reactor 31 are in parallel with the A. C. source, each would have one of the loads 55—56 in its circuit. The circuit whose reactance is decreased allows comparatively more A. C. to reach its load than that of the other which is increased. If the loads 41 and 42 are windings of a direction motor the direction of rotation can be controlled by the input potential, here described.

What is claimed is:

1. In an electrical control system for varying an A. C. output proportional to balance of D. C. inputs a saturable reactor comprising a peripheral continuous magnetic core structure, a first magnetic core member of relatively low-permeability material intersecting said continuous core, a second and third magnetic core member of high permeability material joining said first core in a common junction and extending to said continuous magnetic core structure, a first and second coil wound on each half of said first core member and a third and fourth coil wound on said second and third core members, said third and fourth coils serially connected with the alternating current source, means for supplying separate direct current inputs to said first and second coils whereby unbalanced magnetomotive forces in said first core directs flux thru said second and third cores.

2. In a control circuit a first and second saturable reactor each having a pair of cores of high permeable material perpendicular to a pair of cores of low permeable material and a low permeable core member encircling and joining the outer extremities of said pairs of cores, a first pair of A. C. coils wound on said high permeable cores, a first and second D. C. coil each wound on the remaining cores of said first saturable reactor, a second pair of A. C. coils wound on said high permeable cores and a third and fourth coil wound on the remaining cores of said second saturable reactor, a pair of tubes connected in push-pull relationship, a series circuit including the anode of one of said push-pull tubes, said first D. C. coil, said fourth D. C. coil to a source of D. C. potential, another series circuit including the anode of said other tube, said third D. C. coil, said second D. C. coil to said D. C. potential, said pairs of A. C. coils each connected in series with said load and an A. C. source.

3. A saturable reactor for controlling an A. C. output proportional to difference in D. C. control voltages comprising a closed magnetic core, a plurality of perpendicular radial cores extending to the closed magnetic core, one pair of collinear radial cores of high permeability material with coils adapted to be connected in series and to the A. C. source, the remaining radial cores being of low permeability material having coils connected to separate direct current sources whereby unbalance in the direct current sources diverts flux through said high permeability cores.

4. A saturable reactor having a pair of mutual perpendicular inner cores extending to and surrounded by a continuous outer core, one of said inner cores being of relatively high permeability material and the other being of relatively low permeability material, said inner cores having coils included on each half portion, the coils on the high permeability core connected in series to the A. C. supply, the remaining coils connected to separate direct current supplies whereby unequal energization of said coils on said low permeability core diverts a portion of the flux from said outer core through said high permeability core.

References Cited in the file of this patent
UNITED STATES PATENTS

| | | |
|---|---|---|
| 720,884 | Burgess et al. | Feb. 17, 1903 |
| 2,464,287 | Beamer | Mar. 15, 1949 |
| 2,531,211 | Glass | Nov. 21, 1950 |
| 2,760,145 | Dunn | Aug. 21, 1956 |